(12) United States Patent
Duyvesteyn et al.

(10) Patent No.: US 6,350,420 B1
(45) Date of Patent: Feb. 26, 2002

(54) RESIN-IN-PULP METHOD FOR RECOVERY OF NICKEL AND COBALT

(75) Inventors: Willem P. C. Duyvesteyn; David A. Neudorf, both of Reno; Erik M. Weenink, Sparks, all of NV (US)

(73) Assignee: BHP Minerals International, Inc., Reno, NV (US)

( * ) Notice: Subject to any disclaimer, the term of this patent is extended or adjusted under 35 U.S.C. 154(b) by 0 days.

(21) Appl. No.: 09/515,972

(22) Filed: Feb. 29, 2000

Related U.S. Application Data

(60) Provisional application No. 60/159,657, filed on Oct. 15, 1999.

(51) Int. Cl.[7] ......................... C22B 23/00; C22B 15/00; C22B 34/00
(52) U.S. Cl. ................... 423/139; 423/150.1; 423/140; 423/37; 423/53
(58) Field of Search .............................. 423/139, 140, 423/150.1, 150.4, 37, 53

(56) References Cited

U.S. PATENT DOCUMENTS

| | | | |
|---|---|---|---|
| 3,998,924 A | * 12/1976 | Jones et al. | 423/139 |
| 4,098,867 A | * 7/1978 | Grinstead et al. | 423/139 |
| 4,405,570 A | 9/1983 | Van der Meulen et al. | |
| 5,141,965 A | * 8/1992 | Pike | 423/139 |
| 5,571,308 A | * 11/1996 | Duyvesteyn et al. | 423/139 |
| 5,626,648 A | * 5/1997 | Duyvesteyn et al. | 423/139 |

FOREIGN PATENT DOCUMENTS

| | | |
|---|---|---|
| AU | 701811 | 4/1996 |
| GB | 2 291 870 A | 2/1996 |
| JP | 48024928 | 7/1973 |
| JP | 51121470 | 10/1976 |
| JP | 56136940 | 10/1981 |
| WO | WO 96/20291 | 7/1996 |
| WO | WO 96/41025 | 12/1996 |

* cited by examiner

*Primary Examiner*—Steven Bos
(74) *Attorney, Agent, or Firm*—Brinks Hofer Gilson & Lione G. Peter Nichols

(57) ABSTRACT

A process is provided for the direct recovery of nickel and cobalt from a nickeliferous oxide ore leach slurry by ion exchange. A nickeliferous ore is leached with mineral acid to solubilize the metals. The resulting leach slurry is contacted with ion exchange resin, which selectively loads the nickel and cobalt from the pulp. The resin is separated from the leach slurry by screening and then stripped with an acidic solution. After stripping, the resin is returned to the loading cycle. Nickel and/or cobalt can be recovered in substantially pure form from the eluate by known processes. The metal-depleted slurry proceeds to waste treatment and disposal. This process eliminates the difficult solid/liquid separation, which would otherwise be required to recover metals values from the pregnant leach slurry.

25 Claims, 2 Drawing Sheets

RESIN-IN-PULP METHOD FOR RECOVERY OF NICKEL AND COBALT

This application claims priority to U.S. application Ser. No. 60/159,657, the entire contents of which is incorporated herein by reference.

The present invention relates to the hydrometallurgical processing of nickeliferous or cobaltiferous ores and, in particular, to the direct recovery of nickel and cobalt from a laterite leach slurry by extraction with ion exchange resin, which is then physically separated from the leach slurry.

BACKGROUND OF THE INVENTION

A number of new processes are being developed for the extraction of nickel and cobalt from nickeliferous oxide and laterite ores. Each of these processes dissolve the metal values with mineral acid, followed by solid/liquid separation and neutralization before final metal recovery. The selective metal recovery from the leach slurry is an important step in the design of an economical process. The solid/liquid separation due to the fine particle size distribution and behavior of the leach slurry as well as the selective metal separation from the impurities add cost and complexity to this process.

Nickeliferous oxide ores are formed by weathering of nickel-bearing olivine-rich ultramafic bedrock. The dissolution and re-deposition of the metals produces a very fine material, typically having a particle size less than 50 $\mu$m. These materials can contain substantial amounts of smectite clay. The fineness and behavior of this material rules out filtration as a method of solids/liquid separation, which is normally required for metals recovery from the pregnant leach solution. The other separation method of settling is most effectively accomplished by gravity separation of the fine laterite leach residues in a series of thickeners. To minimize the entrained metal losses, continuous counter-current decantation (CCD) in a series of at least six thickeners is used for solid/liquid separation. To allow proper settling of the solids and to produce a clear overflow for metals recovery, large thickeners (over 50 meters in diameter) are required for each stage. The thickener unit area for each unit for nickel acid leach residues is around 0.1 $m^2/(t/d)$. This compares unfavorably with a unit thickening area requirement of around 1 $m^2/(t/d)$ for settling mineral slurry solids. The large area required for settling of laterite leach slurries, not only affects the overall size of the plant, but also bears a cost. The capital cost for the CCD circuit can be up to 30% of the capital cost of the titanium-clad autoclave in the pressure leaching circuit. These costs are for conventional thickeners, in which fresh water is used. Because some of the laterite deposits are located in arid areas, the available water is saline. In this case, the presence of chlorides in the water requires more expensive materials of construction, because stainless steel at elevated temperatures is not adequately resistant to chloride ions. Therefore, a further significant increase in the capital costs for this thickener area is required when saline water has to be used.

In addition to the capital cost, the operating cost not only includes power consumption for each rake mechanism, but also includes flocculant used for settling the fine material. The flocculant consumption ranges from about 200 to over 800 grams per tonne of solids, which adds up to 10% to the total plant operating costs.

Nickel and cobalt recovery from the clear pregnant leach solution can be done in various ways, but is complicated by the presence of many impurities, such as copper, iron, and manganese. One method to selective extract only nickel and cobalt is by ion exchange, as described in U.S. patent application Ser. No. 08/796,297. Although this patent describes a method to selectively recover nickel and cobalt, it is based on processing of clear leach liquor. In other words, this method requires a solid/liquid separation unit operation after leaching and prior to metals recovery.

In a different metallurgical application, the direct recovery of gold from slurry or pulp by the use of resin-in-pulp (RIP) was developed as an improvement on the carbon-in-pulp process (CIP). The carbon-in-pulp process was developed in the U.S.A. and South Africa during the 1970s (see P.A. Laxen, "Carbon-in-pulp processes in South Africa", Hydrometallurgy, Vol. 13,1984, pp.169–192). Replacing carbon with ion exchange resin is advantageous, because (i) resins offer higher loading capacity and loading rate, (ii) can be more abrasion resistant and (iii) are less likely to be poisoned by organic matter.

The first commercial resin-in-pulp gold extraction plant was the Golden Jubilee Mine in South Africa (see C. A. Fleming, "Recovery of gold by Resin-in-pulp at the Golden Jubilee mine", Precious Metals '89, Edited by M. C. Jha and S. D. Hill, TMS, Warrendale, Pa., 1988, pp. 105–119). Based on the industrial operation at the Golden Jubilee Mine, Fleming analyzed the advantages of RIP versus CIP (C. A. Fleming, "Resin-in-pulp as an alternative process for gold recovery from cyanide leach slurries", Proceedings of $23^{rd}$ Canadian Mineral Processors Conference, Ottawa, January 1991).

As another metallurgical application of the use of resin for metal recovery from slurry, Slobtsov reports that the RIP process can be used to recover additional copper from oxide and mixed ores after conventional flotation for primary copper extraction. In this proposed process, the copper recovery would increase by 7 to 9% by the addition of a resin-in-pulp step after flotation (L. E. Slobtsov, "Resin-in-pulp process applied to copper hydrometallurgy", Copper '91, Volume III, pp. 149–154). A resin with aminodiacetic functionality was used to absorb copper, using either sulfuric acid or ammonia-ammonium carbonate solution as the stripping solution. In this application, the resin-in-pulp process is a secondary recovery step to improve the overall copper recovery.

Johns and Mehmet (M. W. Johns and A. Mehmet, "A resin-in-leach process for the extraction of manganese from an oxide", Proceedings of MINTEK 50: International Conference on Mineral Science and Technology, Published by Council for Mineral Technology, Randburg, South Africa, 1985, pp. 637–645) described the resin-in-leach process, with specific application to extraction of manganese from an oxide. Part of the discussion focused on the compromise of leaching and resin loading with respect to acidity of the solution.

All of the above processes and proposed applications benefit from the direct metals recovery from leach slurry. In these applications, however, solid/liquid separation is simple and conventional and the metal extraction from leach liquor is comparably straight-forward. Therefore, these processes don't offer any substantial improvement over existing processes.

In the gold industry, one advantage for replacing carbon with resin is the increased abrasion resistance of ion exchange resins, which lowers the operating cost related to this consumable. In the laterite leach slurry, it is postulated that the presence of clay reduces the abrasion of the resin. The rheology of the laterite leach slurry is such that solid ore particles are suspended in a fluid medium consisting of ultrafine clay particles and water. As a result, the resin is also suspended within the slurry. This phenomenon significantly reduces resin degradation due to mechanical abrasion.

In the proposed process, a relatively coarse ion exchange resin is added directly to the leach slurry, which contains ore particles much smaller than the ion exchange resin beads. The desired metal(s) are extracted onto the resin and then the resin is separated from the depleted leach slurry by screening or other suitable techniques. Therefore, the present invention provides a novel method for direct metal recovery from acid laterite leach slurry, by elimination of the costly CCD circuit and selective extraction of nickel and cobalt from laterite ores.

SUMMARY OF THE INVENTION

The present invention provides a process for the direct recovery of nickel and cobalt from nickeliferous and/or cobaltiferous oxide ore leach slurry by ion exchange. In one embodiment of the present invention, a nickeliferous ore is leached with mineral acid to solubilize the metals and to form a pregnant solution and leach residue slurry. The nickeliferous ore is selected from the group consisting of laterite ore, oxide ore, and mixtures thereof. The nickeliferous ore contains a first metal selected from the group consisting of nickel, cobalt, or mixtures thereof together with a second metal selected from the group consisting of copper, iron, chromium, magnesium, manganese, aluminum, calcium, and mixtures thereof. The resulting pregnant leach slurry is contacted with ion exchange resin, which selectively loads the nickel and cobalt from the pulp. Preferably, the ion exchange resin is added to the slurry. During the contact of the ion exchange resin with the slurry, the pH may be adjusted by the addition of a neutralizing agent. This is a major advantage of the present invention because pH control in-situ during the ion exchange extraction process allows optimization of metal extraction, which is pH dependent. In another embodiment, the pregnant leach slurry is partially neutralized prior to contacting with the ion exchange resin.

The resin is separated from the leach residue slurry by screening. The metals may be eluted with an acidic or an ammoniacal solution. Multiple contact and screening steps may be employed to effect counter-current flow of leach slurry and resin, thereby improving extraction efficiency. Preferably, the eluting solution is a dilute, acidic solution. After eluting, the resin is returned to the loading cycle. The metal-depleted slurry proceeds to disposal. This process eliminates the difficult and cost intensive solid/liquid separation, which would otherwise be required to recover metals values from the pregnant leach slurry.

It is to be noted that, unless otherwise stated, all percentages stated in this specification and appended claims refer to percentages by weight.

These and other objects, advantages, and features of the present invention will be better understood upon review of the following detailed description.

DETAILED DESCRIPTION OF THE INVENTION

Figure 1:
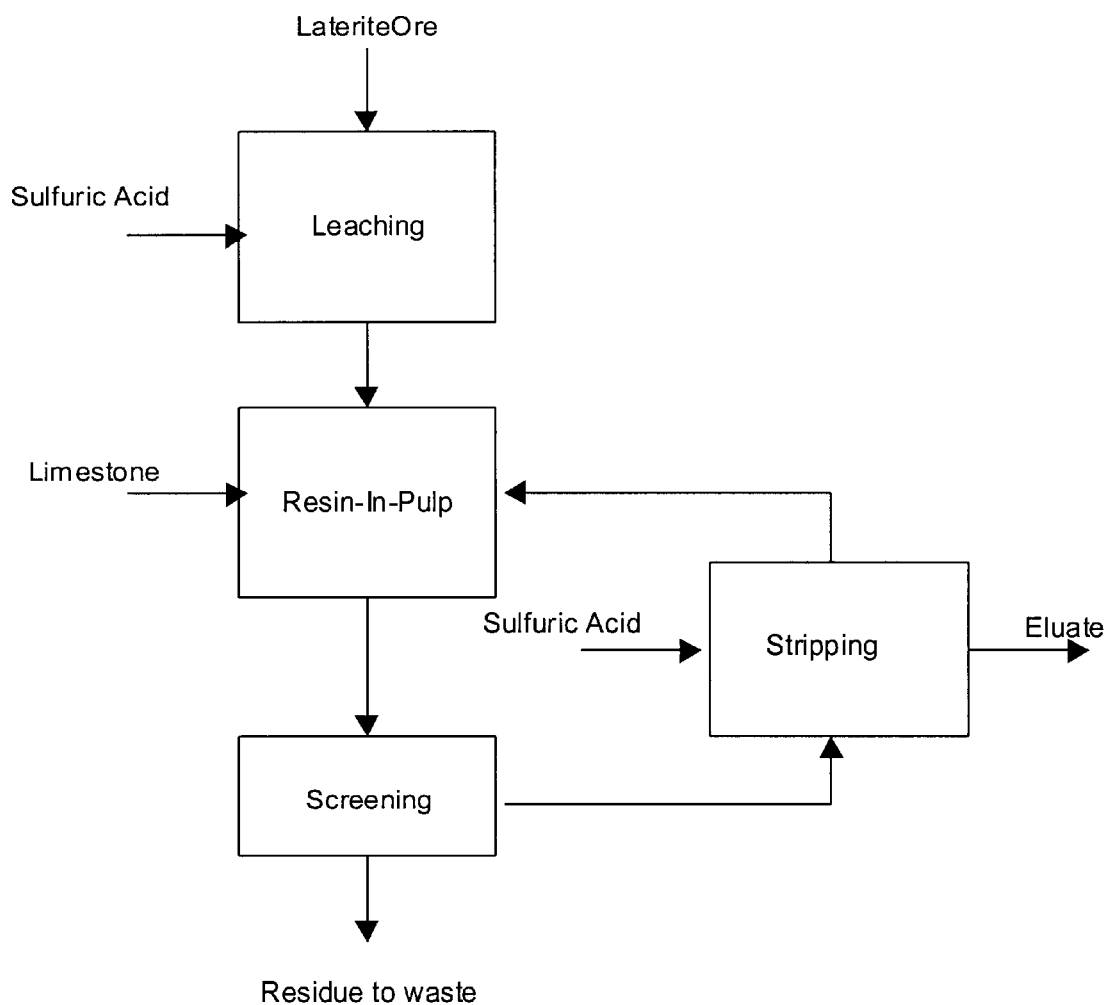
FIG. 1 is a flow sheet for one embodiment of the process of the present invention.

The present invention is a process for the direct recovery of nickel, cobalt, and mixtures thereof from nickeliferous and/or cobaltiferous ore, particularly a laterite leach slurry by ion exchange. Referring to FIG. 1, nickeliferous ore is leached with mineral acid. The nickeliferous ore is selected from the group consisting of laterite ore, oxide ore, and mixtures thereof. The nickeliferous ore contains a first metal selected from the group consisting of nickel, cobalt, and mixtures thereof and a second metal selected from the group consisting of copper, iron, chromium, magnesium, manganese, aluminum, calcium, and mixtures thereof. The leaching can be done in different ways, known to anyone skilled in the art. This includes high pressure leaching, agitation leaching, heap leaching, or a combination of these methods. The objective of the leaching process is to solubilize the metal values in the ore and to form a pregnant solution containing a leach residue slurry.

For example, the leaching can be accomplished using a mineral acid selected from the group consisting of sulfuric acid, hydrochloric acid, nitric acid, and mixtures thereof. The slurry may originate from sulfuric acid pressure leaching of an ore. In yet another alternative, the slurry may originate from atmospheric leaching of an ore and wherein the ore contains cobalt and nickel. The slurry may also originate from the bioxidation of an ore or concentrate selected from the group consisting of sulfide and mixed oxide-sulfide.

Upon completion of the leaching reaction, the pregnant leach slurry is contacted at atmospheric pressure with an ion exchange resin. The solubilized nickel and cobalt are selectively absorbed onto the resin. In the proposed process, a chelating resin is used as described in U.S. Pat. Nos. 4,098,867 and 5,141,965, each of which is incorporated herein by reference. A preferred resin contains a functional group selected from the group consisting of 2-picolylamine, bis-(2-picolyl)amine, N-methyl-2-picoylamine, N-(2-hydroxyethyl)-2-picolylamine, and N-(2-hydroxypropyl)-2-picoylamine, and mixtures thereof. This functional group has a high selectivity of nickel and cobalt over other metals such as manganese, magnesium, aluminum, and calcium. Suitable resins include Rohm and Haas IR 904, Amberlite XE 318, Dow XFS-43084, Dow XFS-4195, and Dow XFS-4196. The Dow XFS-4196 contains N-(2-hydroxyethyl)-2-picolylamine and the XFS-43084 contains N-(2-hydroxypropyl)-2-picolylamine. A preferred chelating resin is Dow XFS-4195, manufactured by The Dow Chemical Company. It contains bis-(2-picolyl)amine as the primary chelating group. The distribution coefficients for a variety of elements using XFS-4195 are shown in the following Table.

| Absorption consistants for XFS 4195 in sulfate solution at pH = 2 | | | | | |
|---|---|---|---|---|---|
| Cu | Ni | $Fe^{3+}$ | Cd | Zn | Co |
| 700 | 190 | 80 | 70 | 60 | 30 |
| | | $Fe^{2+}$ | Ca | Mg | Al | Mn |
| | | 3 | <2 | <1 | <1 | <1 |

Preferably during the contacting, the pH is adjusted by the addition of limestone or other acid neutralizing agent to optimize the metals extraction and provide for optimum selective loading of the nickel and cobalt onto the resin. Generally, the pH of the slurry is maintained between about 1 and about 5, preferably about 3.

Alternatively, during the contacting, the redox potential (Eh) of the slurry is adjusted by the addition of a reductant (elemental iron or aluminum, a sulfide containing mineral), to reduce any trivalent iron to the bivalent state. By minimizing the ferric iron extraction, the nickel and cobalt extraction is optimized by providing optimum selective loading of the nickel and cobalt onto the resin.

The leach slurry may be neutralized with a high magnesium laterite ore. Alternatively, a neutralization agent may be added to the pregnant leach slurry before mixing the ion exchange resin. The neutralization agent may be selected from the group consisting of alkali oxides, alkali hydroxides, alkali carbonates, alkaline earth oxides, alkaline earth hydroxides, alkaline earth carbonates, and mixtures thereof.

The extraction can be carried out at any suitable temperature up to the stability limit of the resin, which is at least about 80° C. In general, the reaction rate will increase with temperature. Therefore, the preferred temperature is between about 60° and 80° C.

Any copper present in the leach solution will also be co-extracted with this resin. If this is undesirable, the copper can be removed from solution before contacting the slurry with the ion exchange resin. The copper, either as a pay metal or as an impurity, can be removed by various methods such as cementation with metals such as iron, aluminum, and magnesium or selective sulfide precipitation. The sulfide-containing compound may be selected from the group consisting of $H_2S$, NaHS, sulfide containing minerals such as pyrrhotite (FeS) or pyrite ($FeS_2$), and mixtures thereof.

Hexavalent chromium will irreversibly oxidize the ion exchange resin, which limits its repeated use. If any hexavalent chromium is present, it should be reduced before contacting the ion exchange resin with the leach slurry. The reduction of chromium can be accomplished by the addition of various reductants, such as $SO_2$, $H_2SO_3$, $Na_2SO_3$, or $H_2S$, iron(II), iron(0), aluminum(0), magnesium(0) or mixtures thereof to the leach slurry.

In addition, tri-valent iron may be removed by forming an alkali iron sulfate hydroxide, e.g. sodium jarosite or potassium jarosite. The tri-valent iron may be precipitated by adding a sufficient amount of an alkali metal-containing compound.

After the metals are loaded onto the resin, the loaded resin is separated from the metal-depleted leach slurry (leach residue slurry). The separation is accomplished physically by screening the larger resin beads from the finer leach residue solids and barren liquid. The leach residue can then be disposed of. The loaded resin is washed and the metals are eluted in a separate circuit. The metals may be eluted using a dilute mineral acid solution, such as HCl or $H_2SO_4$. The strength of the acid solution is from about 0.5 to 4 M, preferably about 1 M. The resultant eluate is a purified and a concentrated nickel and cobalt solution from which a nickel and/or cobalt product can be recovered by methods known to those skilled in the art. The stripped resin is returned to the contacting step of the process.

The following examples illustrate, but do not limit, the present invention. Unless otherwise indicated, all parts and percentages are by weight.

EXAMPLE 1

This example illustrates the recovery of nickel and cobalt from a high-pressure laterite leach solution according to the process of the present invention.

One liter of high iron laterite slurry at 24 wt.-% solids was leached with sulfuric acid (A:O=0.26) for 1.5 hours at 268° C. After leaching, the slurry was cooled rapidly, and neutralized with lime to a pH of 3.0. 650 ml of wet settled Dow XFS-4195 resin was added to the slurry and gently mixed for 2 hours at ambient temperature. The resin was separated from the pulp over a 30-mesh screen. The resin was washed and stripped with 100 g/l sulfuric acid. The composition of the solution in the leach slurry before neutralization (leachate) and the raffinate after contacting with the resin is shown in Table 1. The eluate solution resulting from stripping the resin with 100 g/l $H_2SO_4$ is also shown. The data show a very high recovery for nickel and cobalt, with only minor co-extraction of iron and chromium.

TABLE 1

| | Solution compositions | | | | |
| | Concentration (gpl) | | | | |
| Sample | Ni | Co | Fe | Cr | Al |
| --- | --- | --- | --- | --- | --- |
| Leachate | 4.19 | 0.84 | 0.23 | 0.63 | 0.52 |
| Raffinate | 0 | 0 | 0 | 0.04 | 0.29 |
| Eluate | 2.83 | 0.41 | 0.05 | 0.10 | 0.04 |

EXAMPLE 2

This example illustrates the recovery of nickel and cobalt into a chloride solution from a laterite leach slurry according to the process of the present invention.

Limonite ore slurry (25 wt.-% solids) was leached with sulfuric acid for one hour at 270° C. After flashing and cooling of the slurry, the pH was adjusted to 2.0 with lime. The leach slurry was gently mixed for one hour with 610 ml of XFS-4195 resin. The resin was separated from the leach pulp over a 50 mesh screen. The loaded resin was stripped for 90 minutes with 50 g/l HCl. The nickel concentration in the leachate and eluate, as well as recovery of nickel is shown in Table 2.

TABLE 2

| Nickel content of leachate and eluate in g/l and recovery in % | | |
| --- | --- | --- |
| $Ni_{leachate}$ - gpl | $Ni_{eluate}$ - gpl | $R_{Ni}$ - % |
| 11.0 | 1.38 | 93 |

EXAMPLE 3

One liter of nickel laterite high-pressure leach slurry at 25 wt.-% solids was used for the recovery of nickel and cobalt. The pH of the leach slurry was adjusted to 3.7 by the addition of limestone. The neutralized slurry was mixed with 200 ml of wet settled XFS-4195 resin for two hours at room temperature. After mixing, the resin was screened and washed on a 50-mesh screen. The resin was transferred into a column, stripped with 0.8 liter (4 Bed Volumes) of 100 g/l $H_2SO_4$ and washed with 0.8 liter D.l. $H_2O$ at 4 BV/hr. The composition of the leach solution before neutralization, after contacting with the ion exchange resin (raffinate) and eluate is shown in Table 3. Iron was largely precipitated during the pre-neutralization step and thus does not appear in substantial concentrations in either the raffinate or eluate solutions.

TABLE 3

Composition of leachate, raffinate and eluate in g/l

| Sample | Ni | Co | Fe | Zn | Mn |
|---|---|---|---|---|---|
| Leachate | 5.59 | 0.64 | 9.03 | 0.11 | 2.71 |
| Raffinate | 0.21 | 0.08 | 0.01 | 0.02 | 2.36 |
| Eluate | 5.08 | 0.48 | 0.04 | 0.09 | 0.00 |

EXAMPLE 4

This example illustrates the removal of copper from a pregnant leach solution by precipitation before contact with ion exchange resin.

In preparation for a locked cycle resin-in-pulp experiment, laterite ore was leached to produce a pregnant leach slurry. The composition of the pregnant leach liquor (leachate) is shown in Table 4. The solution was neutralized with 30 wt.-% limestone slurry. Samples were taken at a pH of 3.0 (A) and of a pH of 3.5 (B), as shown in Table 4. During this process, the concentration of copper and iron were reduced, by precipitation of the corresponding hydroxide compounds. After neutralization, a reductant was added in the form of NaHS powder. A total of 6.3 grams was added to 3.4 liters of leach slurry. The final composition of the solution after sulfide precipitation is shown in Table 4 (Sulf.ppt). This shows a further decrease in the iron and copper concentration, together with a small loss of nickel and cobalt.

TABLE 4 pH and composition of pregnant leach liquor in g/l

| Sample | pH | Ni | Co | Fe | Cu |
|---|---|---|---|---|---|
| Leachate | 1.8 | 8.6 | 0.33 | 2.3 | 0.048 |
| Neutr.A | 3.0 | 8.7 | 0.31 | 1.9 | 0.013 |
| Neutr.B | 3.5 | 8.7 | 0.33 | 1.9 | 0.007 |
| Sulf.ppt | 3.3 | 8.0 | 0.28 | 1.7 | 0.001 |

EXAMPLE 5

Figure 2:
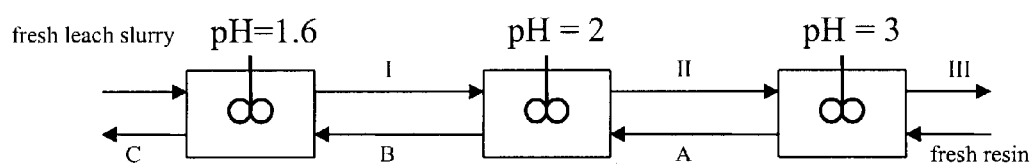
FIG. 2 is a flow sheet for another embodiment of the process of the present invention.

This example illustrates the recovery of nickel and cobalt according to the present invention in a simulated three-stage counter current operation. This system was simulated by a locked cycle batch test. A schematic representation of the three stage countercurrent RIP cycle is shown in FIG. 2.

Laterite ore having 35 wt.-% solids was leached with sulfuric acid, to produce a leach slurry solution containing 9.4 g/l nickel, 0.25 g/l cobalt, 3.5 g/l aluminum, 1.8 g/l iron and 40.5 g/l magnesium. This leach slurry was used in the locked cycle experiment. The locked cycle consisted of four three-step stages, to simulate the counter current flow of leach slurry and ion exchange resin. The ion exchange resin, XFS-4195, was used in a ratio of 25 vol.-% of the leach slurry. The pH during each extraction step was controlled by the addition of a 30 wt.-% limestone slurry. After gently mixing for 15 minutes, the resin was separated from the leach slurry over a 50 mesh stainless steel screen. The composition of the leach slurry and final raffinate is shown in Table 5. The raffinate composition has been corrected for interstage losses on the basis of a magnesium tie. The metals extraction, also included in the table, is calculated on the basis of leachate and raffinate composition. The decrease in iron concentration is not completely due to loading onto the resin, but also because of precipitation from the pH adjustment. Therefore iron extraction can not be calculated from the data.

TABLE 5

Composition of leachate and raffinate in mg/l and metals extraction in %

| Sample | Ni | Co | Fe | Zn | Mn | Mg | Al |
|---|---|---|---|---|---|---|---|
| Leachate - gpl | 9440 | 248 | 1845 | 86 | 1983 | 40488 | 3496 |
| Raffinate - gpl | 0 | 4 | 618 | 0 | 1737 | 40145 | 3327 |
| Extraction - % | 100% | 98% | — | 100% | 12% | 1% | 5% |

While there have been described what are presently believed to be the preferred embodiments of the invention, those skilled in the art will realize that changes and modifications may be made thereto departing from the spirit of the invention. It is intended to claim all such changes and modfications that fall within the true scope of the invention.

What is claimed:

1. A hydrometallurgical process comprising:
   a. providing an aqueous pulp comprising laterite, nickeliferous oxide, or cobaltiferous oxide ore, or a mixture thereof containing a first metal selected from the group consisting of nickel, cobalt, and mixtures thereof together with a second metal different from the first metal, and water;
   b. then leaching the aqueous pulp by adding a mineral acid to dissolve the contained metals to provide a slurry comprising a pregnant solution and a leach residue;
   c. then mixing an ion exchange resin with the slurry, without prior separation of the pregnant solution from the leach residue, to load the first metal onto the resin;
   d. adjusting upward the pH of the slurry with a neutralization agent before or during mixing the resin with the slurry; and
   e. separating the first metal-loaded ion exchange resin from the slurry.

2. The process of claim 1 wherein the second metal is selected from the group consisting of copper, iron, chromium, magnesium, manganese, aluminum, calcium, and mixtures thereof.

3. The process of claim 1 wherein the mineral acid is selected from the group consisting of sulfuric acid, hydrochloric acid, nitric acid, and mixtures thereof.

4. The process of claim 1 wherein the slurry originates from sulfuric acid pressure leaching of a laterite, nickeliferous oxide, or cobaltiferous oxide ore, or a mixture thereof.

5. The process of claim 1 wherein the slurry originates from atmospheric leaching of a laterite, nickeliferous oxide, or cobaltiferous oxide ore, or a mixture thereof.

6. The process of claim 1 wherein the slurry originates from bioxidation of an ore or concentrate selected from the group consisting of sulfide, mixed oxide-sulfide and mixtures thereof, wherein the ore or concentrate contains a metal selected from the group consisting of cobalt, nickel, and mixtures thereof.

7. The process of claim 4 wherein the slurry is neutralized with a high magnesium laterite ore.

8. The process of claim 1 further comprising the step of adding a neutralization agent to the slurry before mixing the ion exchange resin with the slurry, wherein the neutralization agent is selected from the group consisting of alkali oxides, alkali hydroxides, alkali carbonates, alkaline earth oxides, alkaline earth hydroxides, alkaline earth carbonates, and mixtures thereof.

9. The process of claim 1 further comprising adding to the slurry a sufficient amount of an alkali metal containing compound to form alkali metal iron sulfate hydroxide.

10. The process of claim 9 in which tri-valent iron is precipitated by the formation of sodium iron sulfate hydroxide.

11. The process of claim 1 wherein the ore includes copper and wherein the process includes the additional step of removing copper ions from the slurry prior to mixing the ion exchange resin with the slurry.

12. The process of claim 11 wherein the copper ions are precipitated from the slurry by adding at least one soluble sulfide-containing compound to the slurry.

13. The process of claim 12 wherein the sulfide-containing compound is selected from the group consisting of $H_2S$, NaHS, and mixtures thereof.

14. The process of claim 11 wherein the copper ions are precipitated from the slurry by adding a cementation reagent to the slurry.

15. The process of claim 14 wherein the cementation reagent is selected from the group consisting of iron powder, aluminum metal, magnesium metal and mixtures thereof.

16. The process of claim 1 wherein the ore contains chromium (VI) ions and the process includes the additional step of removing chromium (VI) ions from the slurry by reaction with a reductant prior to mixing the ion exchange resin with the slurry.

17. The process of claim 16 wherein the reductant is selected from the group consisting of $SO_2$, $H_2SO_3$, $Na_2SO_3$, $H_2S$, iron (II), iron (0), aluminum (0), magnesium (0) and mixtures thereof.

18. The process of claim 1 in which the ion exchange resin contains a chelating group selected from the group consisting of 2-picolylamine, bis-(2-picolyl)amine, N-methyl-2-picoylamine, N-(2-hydroxyethyl)-2-picolylamine, and N-(2-hydroxypropyl)-2-picoylamine, and mixtures thereof.

19. The process of claim 1 wherein the neutralization agent is added when mixing the ion exchange resin with the slurry.

20. The process of claim 19 wherein the neutralization agent is selected from the group consisting of alkali oxides, alkali hydroxides, alkali carbonates, alkaline earth oxides, alkaline earth hydroxides, alkaline earth carbonates, and mixtures thereof.

21. The process of claim 1 further comprising the step of eluting metals from the metal-loaded ion exchange resin with an acid selected from the group consisting of sulfuric, hydrochloric, nitric, and mixtures thereof.

22. The process of claim 4 wherein the neutralizing agent is added to the slurry during mixing of the ion exchange resin with the slurry.

23. The process of claim 1 further comprising adding to the slurry a sufficient amount of a reductant to reduce trivalent iron to bivalent iron.

24. The process of claim 22 wherein a reductant is added while mixing an ion exchange resin with the slurry.

25. The process of claim 24 wherein the reductant is selected from the group consisting of elemental iron, elemental aluminum, a sulfide containing mineral, and mixtures thereof.

* * * * *